United States Patent
Vander Horst

(10) Patent No.: US 7,389,688 B1
(45) Date of Patent: Jun. 24, 2008

(54) INDIRECT LIQUID LEVEL MEASUREMENT

(75) Inventor: John Vander Horst, 10872 Mill Hollow Rd., Littleton, CO (US) 80127

(73) Assignee: John Vander Horst, Littleton, CO (US)

( * ) Notice: Subject to any disclaimer, the term of this patent is extended or adjusted under 35 U.S.C. 154(b) by 0 days.

(21) Appl. No.: 11/336,030

(22) Filed: Jan. 20, 2006

(51) Int. Cl.
*G01F 23/00* (2006.01)

(52) U.S. Cl. .......................... 73/290 R; 73/299; 73/301; 73/290 B; 210/86

(58) Field of Classification Search ............... 73/290 R, 73/299, 301, 290 B; 210/86
See application file for complete search history.

(56) References Cited

U.S. PATENT DOCUMENTS

| | | | |
|---|---|---|---|
| 4,646,560 A * | 3/1987 | Maresca et al. | 73/49.2 |
| 4,869,104 A * | 9/1989 | Saito et al. | 73/299 |
| 5,079,950 A | 1/1992 | McKiernan et al. | |
| 5,207,251 A | 5/1993 | Cooks | |
| 5,484,336 A * | 1/1996 | McConnell | 460/119 |
| 6,467,343 B1 * | 10/2002 | Baird | 73/323 |
| 6,727,822 B2 | 4/2004 | Chamberlin et al. | |
| 2005/0189275 A1 | 9/2005 | Stewart | |

OTHER PUBLICATIONS

Sample p. 220 from 2003 RV Parts & Accessories Catalog provided by www.delcaminorv.com.

* cited by examiner

*Primary Examiner*—Daniel S. Larkin
*Assistant Examiner*—Samir M. Shah
(74) *Attorney, Agent, or Firm*—Townsend and Townsend and Crew LLP

(57) ABSTRACT

A tank level detection apparatus for indirect measurement of a liquid level in a tank is disclosed. The apparatus includes a second liquid at least partially stored in a reservoir and a one-way valve, which communicates between the reservoir and the tank. A sensor is used to determine a physical characteristic of second liquid from which the level of the liquid in the tank can be determined.

19 Claims, 8 Drawing Sheets

INDIRECT LIQUID LEVEL MEASUREMENT

BACKGROUND

This disclosure relates in general to the measurement of the level or pressure of a liquid, more specifically, to measurement of a liquid in a tank.

Many recreational vehicles have one or more tanks for storing the effluent originating in the toilet or sink. These tanks are often called blackwater or greywater tanks. This effluent can easily clog or otherwise render inoperable a level measurement apparatus or sensors in direct contact with the wastewater. Examples of typical direct wastewater measurement devices are ones that use conductance, capacitance, floats or other direct means for measuring the level of the wastewater in the tank. Despite the numerous cleaning methods and chemicals that have been developed, many of the existing wastewater level measuring methods and systems can fail within several weeks. Thus, the owner of a recreational vehicle either drains the wastewater tank or tanks too frequently or runs the risk of a tank overflow.

SUMMARY

In one embodiment, the present disclosure describes a tank level detection apparatus for determining the level of a first liquid held in a tank that uses: a second liquid at least partially stored in a reservoir; a one-way valve that communicates between the reservoir and the tank; and a sensor that measures a characteristic of the second liquid. The second liquid is at least partially held in the second reservoir because some of the liquid may have flowed into the tank through the one-way valve. In order to maintain the correct liquid level in the reservoir, liquid is added to the reservoir periodically during normal operation. The characteristic measured by the sensor can be used to indirectly measure the level of the first liquid in the tank. Examples of characteristics of the second liquid that could be measured are pressure and liquid level. Sensing can be visual or indirect through the use of a transducer. The reservoir can be either inside the tank, outside the tank or partially inside the tank. The second liquid, or measurement liquid can have properties that are more benign to the measurement sensors or apparatus. By measuring the second liquid, the level of the first liquid can be determined without the measurement apparatus needing to come into direct contact with the first liquid.

In another embodiment, a tank level detection apparatus for indirect measurement of a liquid level in a tank is disclosed. The apparatus includes a liquid communication coupling between the liquid in the tank and a second liquid at least partially stored in a reservoir, where the liquid communication coupling communicates pressure between the liquid in the tank and the second liquid in the reservoir, whereby the liquid and second liquid can equalize. This type of liquid communication coupling can also be called a pressure transfer coupling. The liquid communication coupling can take many forms including a flexible membrane or a moveable piston. A sensor is used to determine a physical characteristic of second liquid from which the level of the liquid in the tank can be determined.

In another embodiment, a liquid pressure detection apparatus for detecting determining a first pressure of a first liquid in a tank is disclosed. This apparatus a second liquid stored in a reservoir. It also includes a liquid communication coupling that communicates pressure between the reservoir and the tank, therefore equalizing the first and second liquid. This liquid communication coupling can be one-directional. In one embodiment, the direction of communication and liquid flow is from the reservoir to the tank. A sensor can then be used to determine the first pressure from the second pressure. In one embodiment, liquid is automatically added to the reservoir during normal operation to ensure that there is sufficient liquid in the reservoir to flow to the tank.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

In one embodiment, a second liquid is used in communication with a first liquid to indirectly measure the level of the first liquid by measuring a characteristic of the second liquid such as its level or pressure, for example. One potential application for the present invention is the measurement of wastewater in a holding tank of a recreational vehicle.

In one embodiment, a flexible liquid-filled impermeable membrane is coupled to a sewage (or other liquid) holding tank of a recreational vehicle. The liquid inside the membrane is connected to a sensor or gage that measures its pressure or level. This liquid inside the membrane, or measurement liquid, can be of a formulation that is more compatible with the measurement technology being used. The pressures of the sewage and measurement liquid are equal because the membrane is flexible and generally unconstrained. Any resistance imposed by a liquid communication coupling (e.g., a membrane, one-way valve, piston) can be corrected for. If the sewage and the measurement liquid have the same density, the level of the two liquids will be the same. If the two liquids have different densities, the ratio of their levels will generally be in proportion to their densities. In one embodiment, the use of two liquids allows for measurement of the sewage using a measuring liquid in the on one side of a membrane that will not be fouled by the contents of a holding tank or other contents of a tank.

Figure 1:
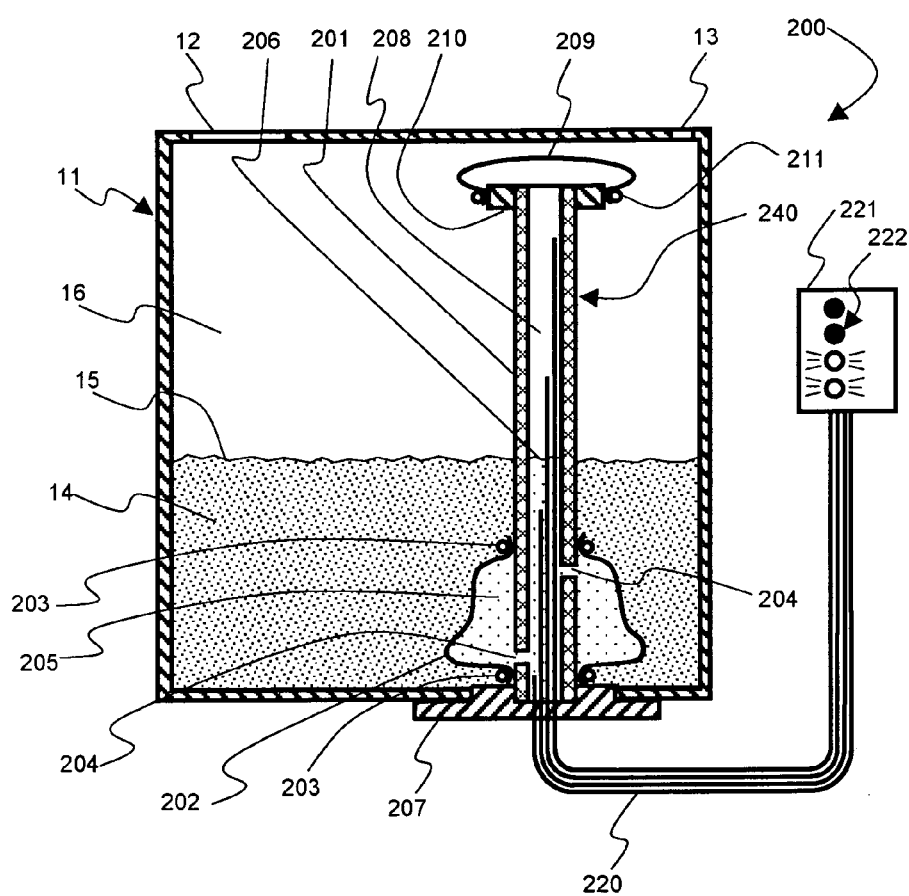
FIG. 1 depicts an indirect liquid level detection apparatus in a wastewater tank.

Referring first to FIG. 1, the bottom portion of a large reservoir (shown as a tank at 11) is connected to the bottom portion of a small reservoir (shown as a hollow tube at 201 and a flexible impermeable membrane at 202). The large reservoir 11 contains liquid A, shown at 14, and the small reservoir contains liquid B, shown at 205. A flexible impermeable membrane 202 separates the two liquids. The pressures of the two liquids 14, 205 are equal at the point of connection because the forces or pressures on both sides of the membrane 202 are equalized. If two liquids 14, 205 have the same density, then the level of the two liquids will be the same. This allows for indirect measurement of the level of liquid A 14 by measuring the level of liquid B 205. Although the membrane 202 is impermeable to both liquids 14, 205 in this embodiment, other embodiments could use a membrane 202 that is only impermeable to liquid A 14.

The principle illustrated in FIG. 1 is useful if it is difficult to measure the level of liquid A 14. By creating a liquid 14 to membrane 202 to liquid 205 interface, indirect measurement of the level of liquid A 14 by measuring the level using liquid B 205 is possible. This embodiment can be applied to holding tanks in recreational vehicles. For example, liquid A 14 is the wastewater, commonly referred to as black water or gray water, which often fouls conventional liquid level measuring devices. By transmitting the liquid level information to liquid B 205, we can prevent the fouling of the liquid level-measuring device.

The indirect liquid level measuring system 240 illustrated in FIG. 1 uses a liquid-membrane-liquid interface to indirectly measure the level of a first liquid 14 by measuring the level of a second liquid 205. In various embodiments, this interface can include other elements and configurations capable of being understood by anyone skilled in the art. Examples of these include:

having a first liquid in communication with a second liquid through a membrane coupled to a gas, coupled to a second membrane, which is coupled to the second liquid; and having the first liquid in communication with a second liquid through a membrane coupled to a gas which is coupled to a second liquid; or any other combination of transmission systems or devices capable of being understood by anyone skilled in the art.

The system 200 illustrated in FIG. 1 can be constructed of a tank for storing a fluid, shown at 11, and a indirect liquid level detection apparatus shown at 240. In the case of an recreational vehicle, the tank 11, is typically a wastewater holding tank 11 made of polyethylene or ABS (acrylonitrile-butadene-styrene) that is mounted underneath the recreational vehicle floor and has pipes going into the tank 11 through a fill hole, shown at 12. There is typically also a vent hole, shown at 13. In this example, the tank 11, holds wastewater, shown at 14. The liquid level of this wastewater is shown by the vertical distance from the bottom of the tank 11 to the surface of the wastewater 15. In this example, the volume above the wastewater is filled with air, shown at 16, which can vent to the atmosphere.

An embodiment of the indirect liquid level detection apparatus 240 shown in FIG. 1 can be constructed from the following elements:

a hollow tube, shown at 201, which in one embodiment is made of polyethylene;

a fluid communication coupling, shown at 202, which in one embodiment is made of a latex rubber balloon that has been opened at two ends;

one or more fastening devices, shown at 203, for attaching the fluid communication coupling 202 to the hollow tube 201, which in one embodiment are O-rings that have been stretched over the balloon and tube;

one or more orifices, shown at 204, for ensuring that fluids can travel between the volume enclosed by the balloon and the tube 201 to create a second storage fluid container that is in communication and pressure-equalized with the wastewater 14;

a measurement fluid, shown at 205, which in one embodiment is composed of clean water with additives to prevent freezing and enhance electrical conductivity using chemicals capable of being understood by anyone skilled in the art;

a mounting flange, shown at 207, which in one embodiment is a cylindrical polyethylene piece that has been machined to fit into a circular hole drilled into the bottom of the tank 11 and to accept the hollow tube 201, and is attached to the tank 11 and to the hollow tube 201 using epoxy cement;

a second gas, shown at 208, that fills the hollow tube 201 in the space above the measurement fluid 205, which in one embodiment is air;

a second impermeable membrane, shown at 209, that seals the second gas 208 from the air in the wastewater tank 16 to prevent evaporation of the measurement fluid, shown at 205, which in one embodiment is made of polyethylene sheeting;

a mounting collar, shown at 210 and fastening device 211 (e.g., an O-ring) for attachment and enclosure of the hollow tube and the second impermeable membrane 209; and a set of insulated copper wires, shown at 220, that each have one conductive copper ends are exposed to the measurement fluid 205 or second gas 208 at various levels in the hollow tube 201 and have their other ends wired into a conductance sensor, shown at 221, which in one embodiment has a set of indicator lights, shown at 222, for displaying the level of the measurement fluid 205 as a surrogate for the level of the wastewater 14.

In one embodiment of the present invention, the conductance sensor 221 and copper wires 220 register high conductivity with an indicator light 222 turned on if there is measurement fluid 205 (and therefore low resistance) between the tips of the shortest copper wire and another longer copper wire. An indicator light 222 is not lit if there is no conductance (i.e., gas instead of a conductive measurement fluid 205) in part of the path used to complete the circuit between the tips of the copper wires. The bottom indicator light is always lit when the fluid level is checked to verify that the sensor is working. To conserve electrical power, the conductance sensor 221 typically only uses electricity to turn on the indicator lights if a push button is pressed or a switch is turned on.

Conductance sensors 221 of the type described here have been used in the prior art, but in direct contact with the black water 14. In one embodiment, the present invention can be retrofitted to work with existing conductance sensors that may already be installed. In the prior art, the electrodes (i.e. copper wires) were placed in direct contact with the wastewater, typically by mounting them through the walls of the wastewater tank. Because the wastewater contains various solids, these solids built up on the conductors and walls of the tank in conventional systems creating a low resistance electrical path even when the wastewater was not at a level appropriate for such a reading.

Further referring to the embodiment illustrated in FIG. 1, it should be noted that because the density of the measurement fluid 205 can be approximately the same as that of the wastewater 14, the level of the measurement fluid, shown at 206 is approximately the level of the wastewater, shown at 15. However, the measurement fluid 205 and wastewater 14, or other similar fluid to be measured can also have significantly different densities an the present invention will still function. It should also be noted that the present invention can also be implemented in a tank 11 that does not have a vent hole and might be either pressurized relative to the atmospheric pressure or have vacuum. It should further be noted that the communication coupling can be implemented in any of a number of ways capable of being understood by anyone skilled in the art, such as a rigid moveable piston that slides in a tube or a semi-rigid bellows.

Figure 2A:
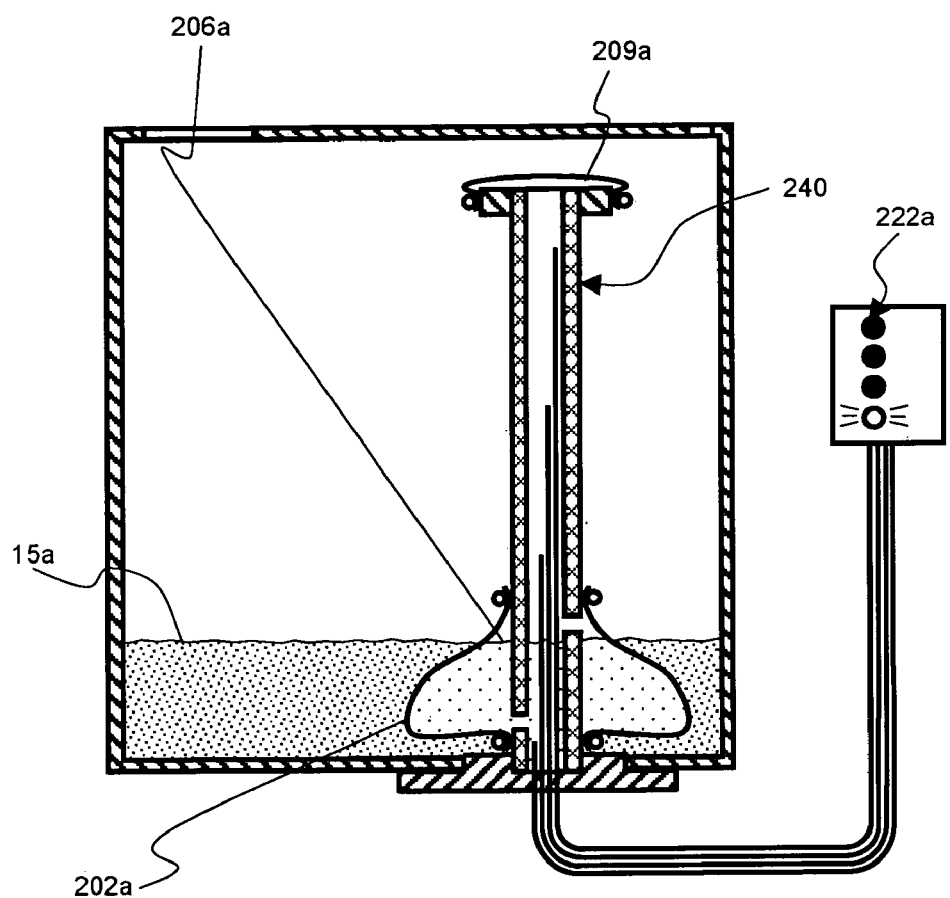
FIG. 2a shows the apparatus of FIG. 1 at a low wastewater level.
Figure 2B:
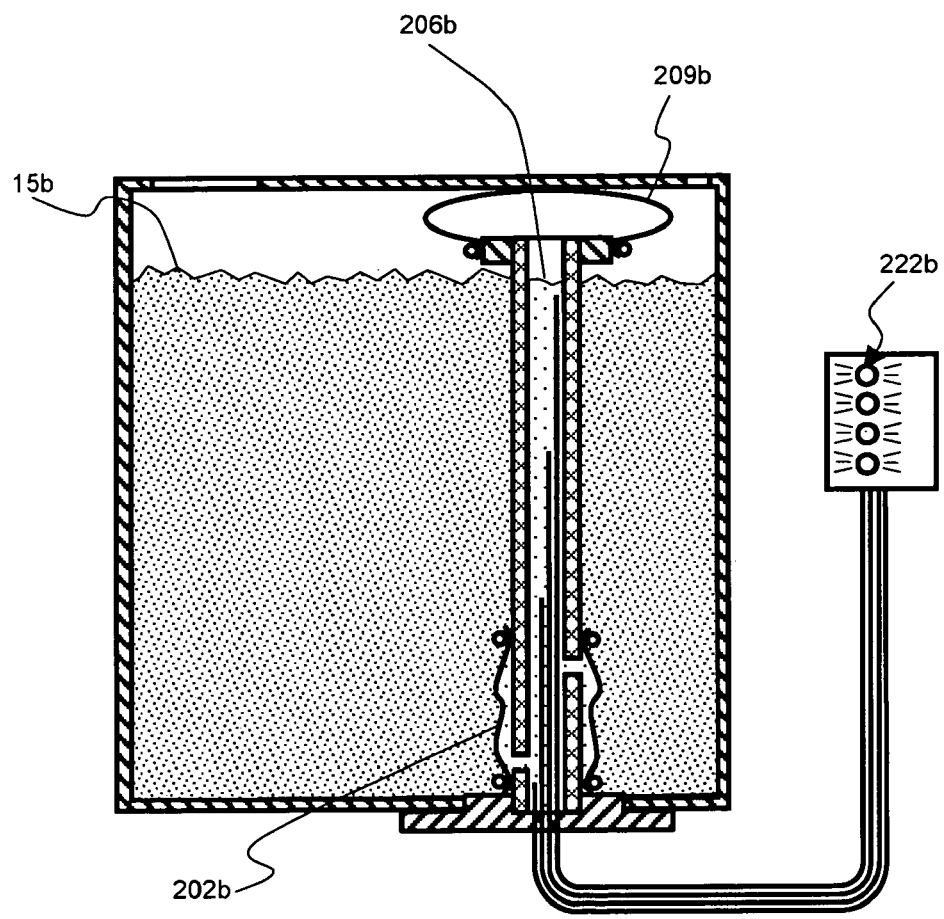
FIG. 2b shows the apparatus of FIG. 1 at a high wastewater level.

Referring to FIG. 2a and FIG. 2b, the embodiment of FIG. 1 is depicted at a low wastewater level, shown as 15a in FIG. 2a, and high wastewater level, shown at 15b in FIG. 2b, respectively. These figures depict alternate liquid communication coupling positions, shown at 202a and 202b. The figures also depict alternate measurement fluid levels 206a and 206b, alternate positions for the second impermeable membrane, 209a and 209b, and alternate indicator light readings, 222a and 222b.

Figure 3:
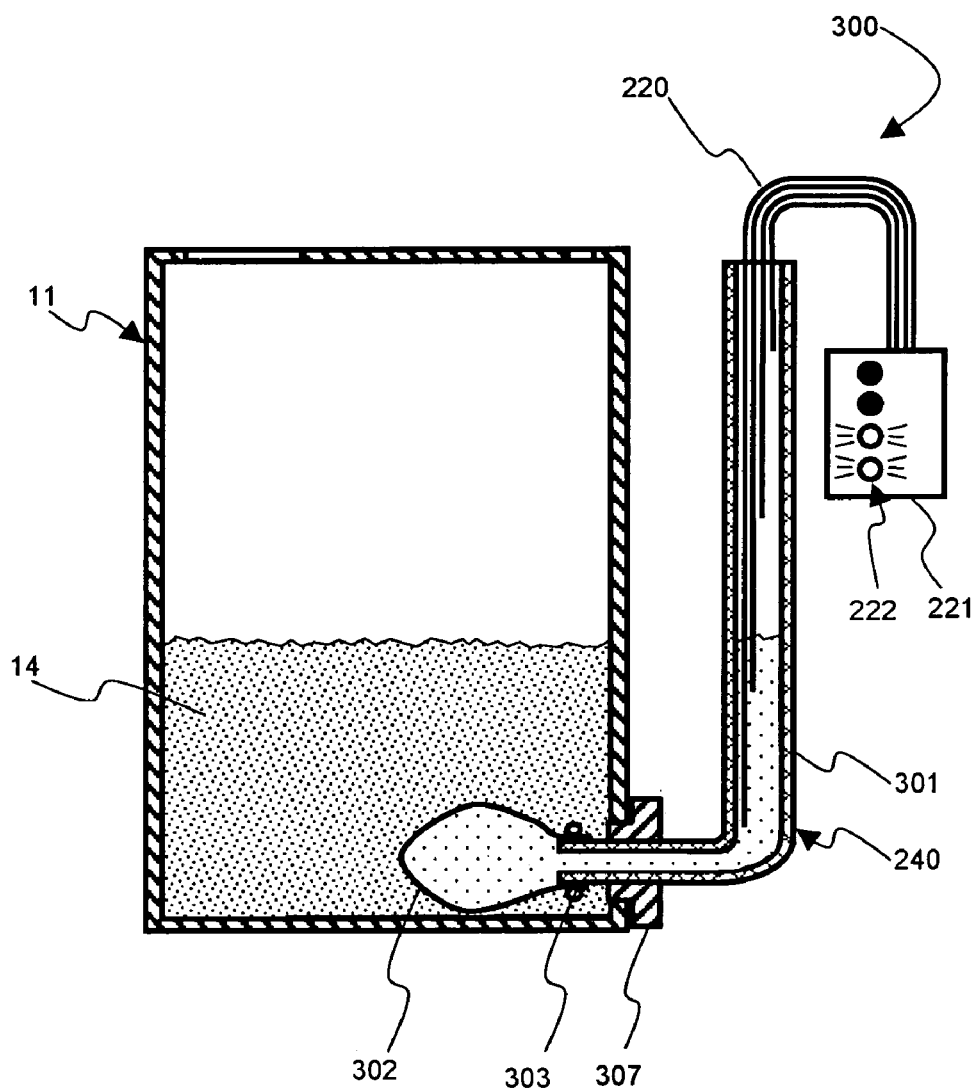
FIG. 3 illustrates an alternate embodiment of an indirect liquid level detection apparatus in a tank.

Referring to FIG. 3, an alternate embodiment of an indirect liquid level detection apparatus 240 is shown in the system 300. The alternate embodiment 240 can be used in a similar tank 11 for storing wastewater 14 that was illustrated previously. The alternate embodiment 240 includes:

an alternate liquid communication coupling shown at 302, one example of which is a latex rubber balloon that is slipped over the alternate hollow tube, shown at 301, and attached with a fastening device, shown at 303, such as an o-ring;

an alternate mounting flange, shown at 307, which in one embodiment is a cylindrical polyethylene piece that has been machined to fit into a circular hole drilled into the side of the tank 11, the flange 307 having a thru-hole for the alternate hollow tube 301 and being attached to the tank 11 and to the hollow tube 301 using epoxy cement; and a similar configuration for the insulated copper wires 220, conductance sensor 221, and indicator lights discussed previously, except in this case, the copper wires exit the hollow tube 301 from the top.

Figure 4A:
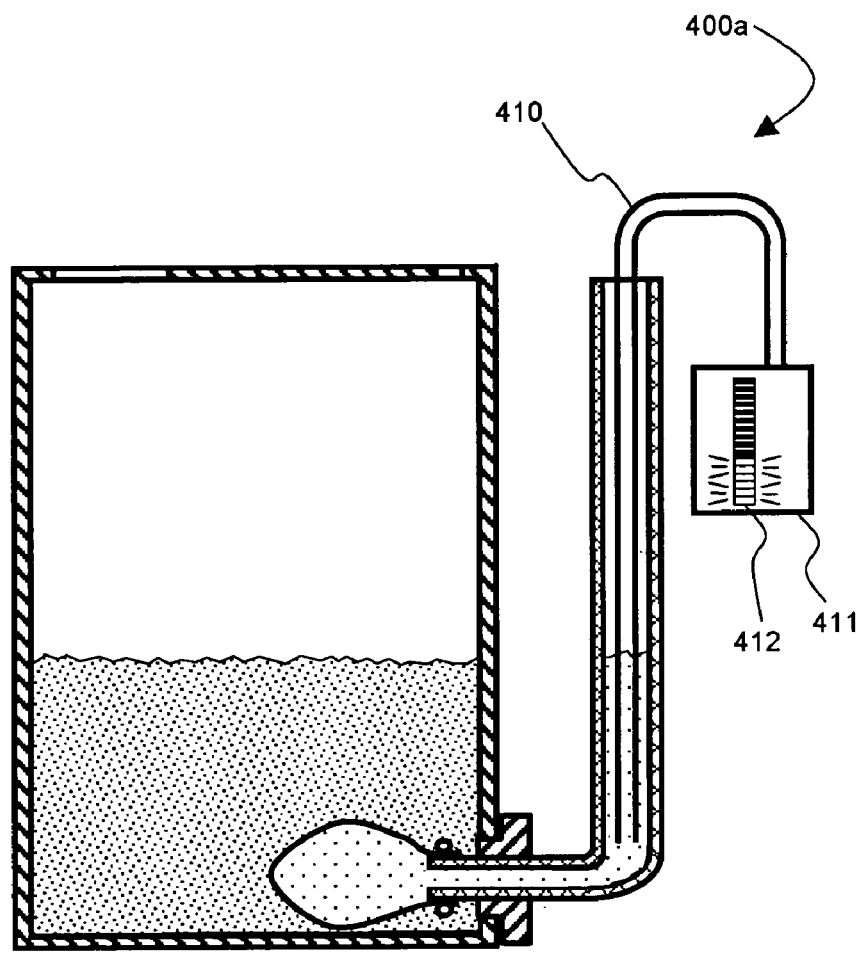
FIG. 4a, FIG. 4b, and FIG. 4c provide examples of alternate indirect liquid level detection devices.
Figure 4B:
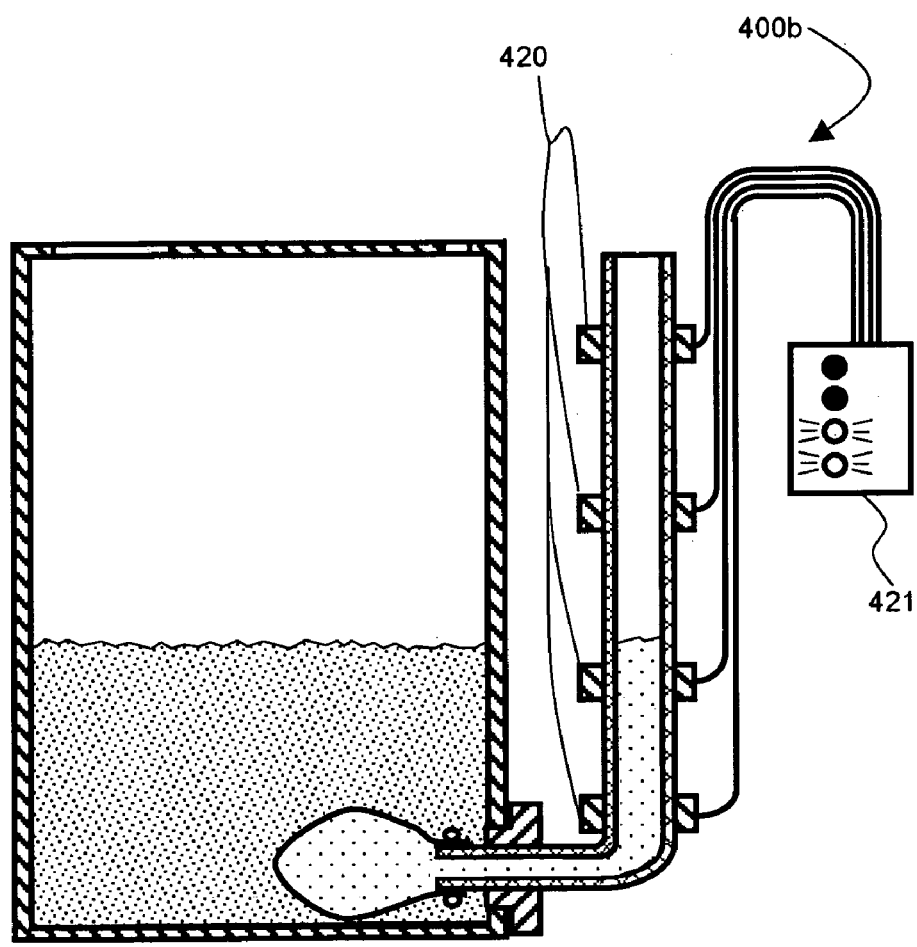
Figure 4C:
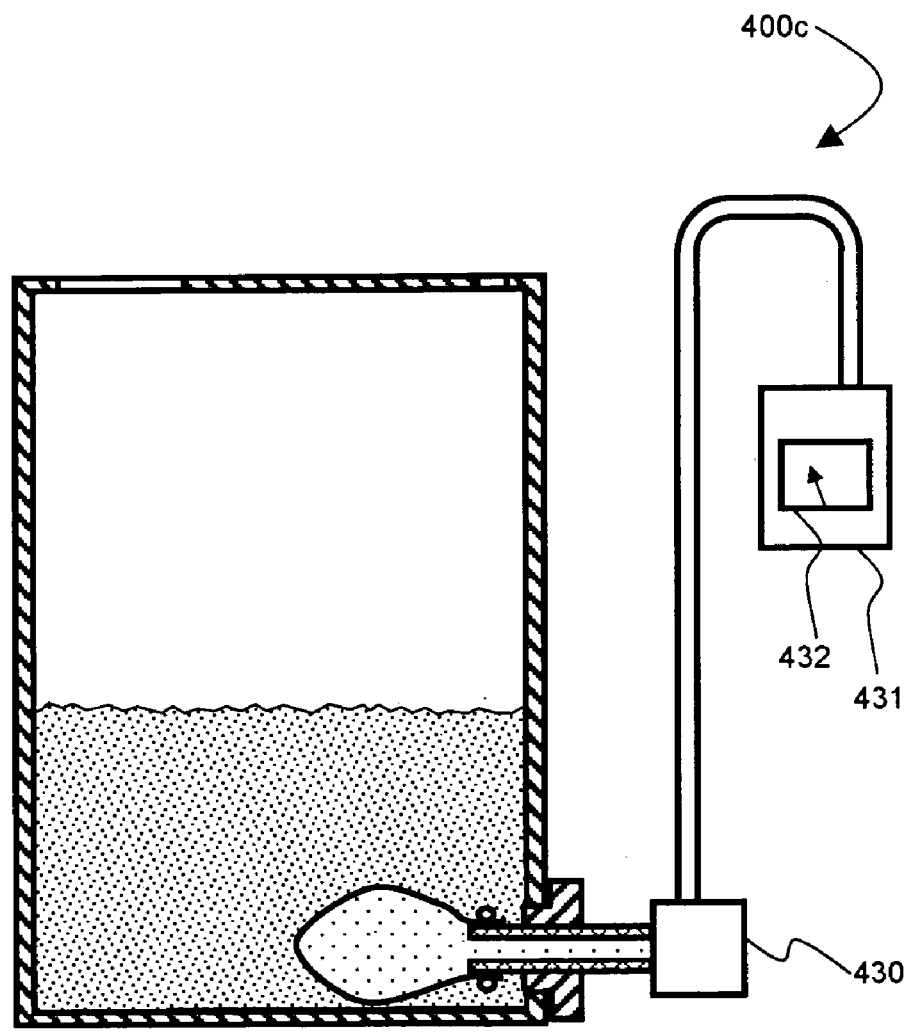

Referring to FIG. 4a, FIG. 4b, and FIG. 4c, several of alternate liquid level sensing technologies are illustrated. Examples illustrated here include:

an indirect liquid level sensing apparatus, shown in the system 400a of FIG. 4a, that uses the variation in capacitance between two parallel electrodes, shown at 410, to determine liquid level using the principle that when a liquid with a different dielectric constant from air fills a proportion of the area between the parallel electrodes, the capacitance of the pair of electrodes changes and can be measured with a capacitance sensor, shown at 411, and can be presented using any appropriate display technology such as the analog bar graph display, shown at 412;

an indirect level sensing apparatus, shown in the system 400b of FIG. 4b, that uses external sensors, shown at 420 to measure a physical parameter of the material in the tube, such as conductance, capacitance, hall effect, sound transmission, light transmission, magnetic permeability, etc. in a non-contact fashion, and uses a external sensor indicator box, shown at 421 to present the results;

an indirect level sensing apparatus, shown in the system 400c of FIG. 4c, that uses a sensing device that does not depend on displacement, one example of which is the pressure transducer, shown at 430, which when coupled to an appropriate sensor indicator box shown at 431 will have the ability to indicate fluid level using an appropriate display technology such as the analog level meter shown at 432; or other similar variations or combinations capable of being understood by anyone skilled in the art such as floats, etc.

Figure 5:
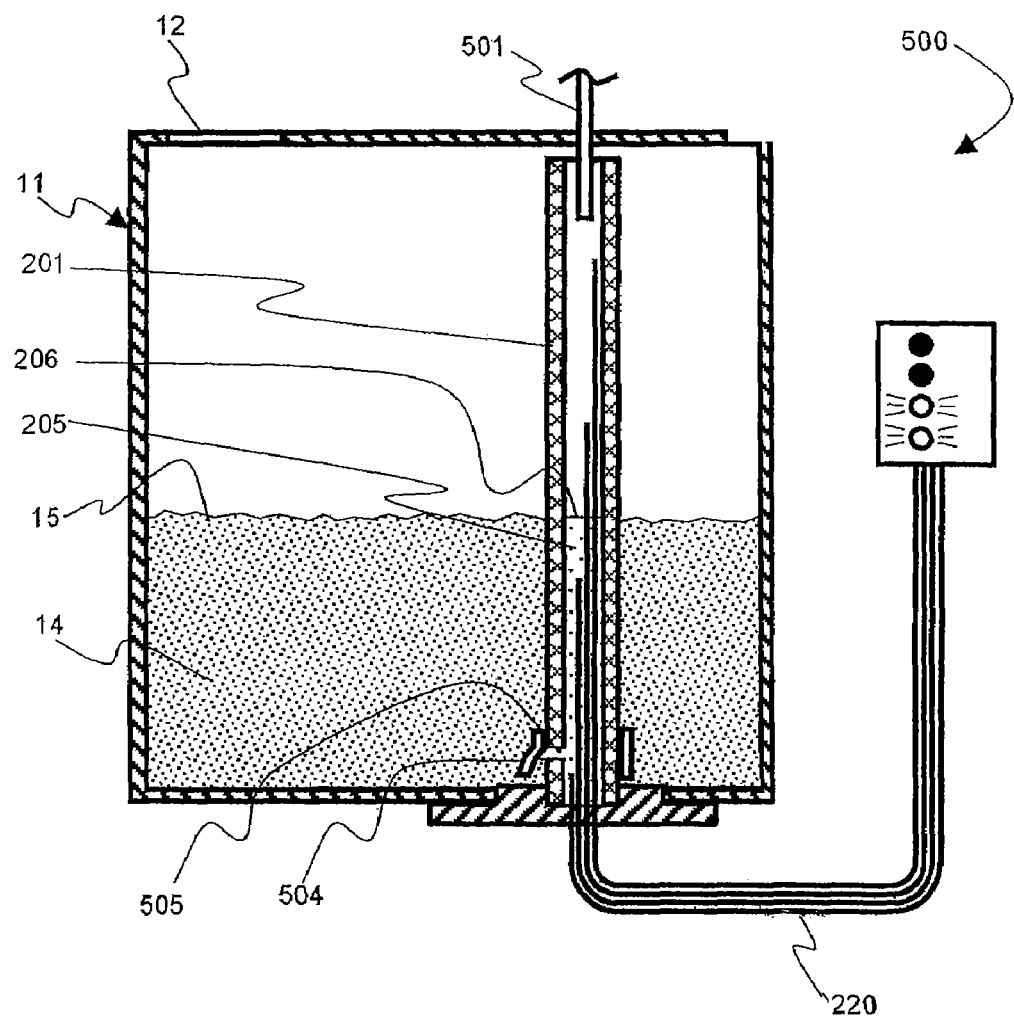
FIG. 5 illustrates indirect liquid level detection using one-way fluid flow.

Referring to FIG. 5 a further embodiment of the indirect liquid level detection apparatus 240 is shown adapted to the system 500. In this further embodiment, fluid communication coupling is provided using one-way flow of the measurement fluid, shown at 205, into the tank 11, through either a small orifice, shown at 504, or a check valve, shown at 505, or a combination of an orifice and check valve, or any other combination of elements capable of being understood by anyone skilled in the art. This embodiment 500, also includes a filler tube shown at 501 through which measurement fluid 205 is added so as to ensure that fluid flow is always in one direction from the hollow tube 201 into the tank 11. One example of a method for ensuring that fluid flow is always one directional is to have a portion of the clean flushing water directed to into the filler tube 501, while the rest is sent through the toilet to ultimately emerge into the tank as wastewater through the fill hole 12.

A number of variations and modifications of the disclosed embodiments can also be used. For example, measurement of liquid pressure or level in the embodiments discussed in this disclosure can be applied to other liquid level or liquid pressure measurement tasks beyond holding tanks and recreational vehicles. This principle can also be applied to measuring gas pressure if a gas-filled membrane is used.

While the principles of the disclosure have been described above in connection with specific apparatuses and methods, it is to be clearly understood that this description is made only by way of example and not as limitation on the scope of the disclosure.

What is claimed is:

1. A tank level detection apparatus adapted for determining a first level of a first liquid within a tank, the tank level detection apparatus comprising:
   a reservoir that is adapted to, at least partially, hold a second liquid;
   a one-way valve between the reservoir and the tank wherein the tank is adapted to hold the first liquid, wherein the one-way valve communicates the second liquid from the reservoir to the tank; and
   a sensor used in determining a characteristic of the second fluid, wherein the first level can be determined from the characteristic.

2. The tank level detection apparatus adapted for determining the first level of the first liquid within the tank as recited in claim 1, wherein the sensor detects a pressure of the second liquid.

3. The tank level detection apparatus adapted for determining the first level of the first liquid within the tank as recited in claim 1, wherein the sensor detects a level of the second liquid.

4. The tank level detection apparatus adapted for determining the first level of the first liquid within the tank as recited in claim 1, wherein the reservoir is placed, at least partially, within the tank.

5. The tank level detection apparatus adapted for determining the first level of the first liquid within the tank as recited in claim 1, wherein the reservoir is, at least partially, outside the tank.

6. The tank level detection apparatus adapted for determining the first level of the first liquid within the tank as recited in claim 1, wherein the tank is configured to hold wastewater.

7. The tank level detection apparatus adapted for determining the first level of the first liquid within the tank as recited in claim 1, wherein the tank is configured to mount with a moving vehicle.

8. A method for sensing a liquid level, the method comprising steps of:
   moving, at least part of, a pressure transfer coupling in response to liquid pressure from a tank;
   coupling the liquid pressure to a reservoir of liquid, whereby the liquid pressure is reflected in the reservoir of liquid, wherein the liquid in the reservoir is separated from any liquid in the tank;
   adding liquid to the reservoir periodically during normal operation;
   sensing a parameter of the liquid in the reservoir; and
   determining the liquid level in the tank from the liquid in the reservoir as reflected in the parameter.

9. The method for sensing the liquid level as recited in claim 8, wherein the liquid pressure is determined by measuring a level of liquid in the reservoir.

10. The method for sensing the liquid level as recited in claim 8, wherein the liquid in the reservoir is intermittently separated from any liquid in the tank.

11. The method for sensing the liquid level as recited in claim 8, wherein:
    the sensing step comprises a step of measuring a level of liquid in the reservoir, and
    the parameter reflects the level.

12. The method for sensing the liquid level as recited in claim 8, wherein:
    the sensing step comprises a step of measuring a pressure of liquid in the reservoir, and
    the parameter reflects the pressure.

13. A machine adapted to perform the machine-implementable method for sensing the liquid level of claim 8.

14. A method for sensing a liquid level, the method comprising steps of:
    moving, at least part of, a pressure transfer coupling in response to liquid pressure from a tank, wherein the moving step comprises a step of moving a one-way valve to equalize pressure between a reservoir of liquid and the tank;
    coupling the liquid pressure to the reservoir, whereby the liquid pressure is reflected in the reservoir of liquid, wherein the liquid is separated from any liquid in the tank; and
    sensing a parameter of the liquid in the reservoir.

15. The method for sensing the liquid level as recited in claim 14, wherein a liquid-level of the reservoir is configured for viewing from outside the tank.

16. A liquid pressure detection apparatus adapted for determining a first pressure of a first liquid within a tank, liquid pressure detection apparatus comprising:
    a one-directional valve, wherein the tank is adapted to hold the first liquid;
    a reservoir;
    a second liquid, at least partially, stored in the reservoir, wherein:
    the one-directional valve communicates pressure between the reservoir and the tank, whereby the first liquid equalizes with the second liquid using the one-directional valve, and
    the direction of liquid flow is from the reservoir to the tank; and
    the reservoir is separated from the tank; and
    a sensor used in determining a second pressure of the second liquid, whereby the first pressure can be determined from the second pressure.

17. The liquid pressure detection apparatus adapted for determining the first pressure of the first liquid within a tank as recited in claim 16, wherein liquid is added to the second liquid during normal operation.

18. The liquid pressure detection apparatus adapted for determining the first pressure of the first liquid within a tank as recited in claim 16, wherein the tank is configured to hold wastewater.

19. The liquid pressure detection apparatus adapted for determining the first pressure of the first liquid within a tank as recited in claim 16, wherein the tank is configured to mount with a moving vehicle.

* * * * *